United States Patent Office 2,797,207
Patented June 25, 1957

2,797,207

DIENEIC RESIMERS OF EMULSION DIENEIC POLYMERS AND METHODS OF PRODUCING SAME

Oliver W. Burke, Jr., Grosse Pointe Park, Mich.

No Drawing. Application January 30, 1953,
Serial No. 334,359

2 Claims. (Cl. 260—82.3)

The present invention relates to the treatment of dieneic and dieneic-vinyl materials to convert them to thermally crosslinked, hard, insoluble products, herein termed resimers, which term is hereinafter defined, and aims to improve and facilitate the conversion process and to produce specifically new products having new and desirable properties.

PROLOGUE

If diene or vinyl monomers are subjected to heating at a temperature of from 250 to 300° C. they undergo exothermal polymerization to low molecular weight materials such as dimers, trimers, and possibly tetramers which are also partially thermally degraded, producing a viscous oily liquid mass of evil odor and unsuitable for any known useful application.

Schmidt et al. U. S. Patent No. 1,901,044, dated March 14, 1933, disclosed that by a special process a hard product that is essentially free from double bonds and has certain desirable characteristics, can be made from certain diene monomers having congugated double bonds, the product being described by Schmidt et al. as an organic ceramic or resin product. This Schmidt et al. conversion was accomplished by a two step process, by (1st) mass polymerizing the monomer with metallic sodium and (2nd) heating the resultant polymer at a temperature close to 300° C. in order to convert it to the new resinous material.

The Schmidt et al. patent suggested that the mass polymerization step might be catalysed by certain alleged mass polymerization catalysts, viz: ozonides, or albumen, or aqueous hydrogen peroxide, in lieu of the sodium metal, but contains no disclosure as to how this might be accomplished, and gives no indication that the products, if so obtainable, would be any different from those obtained when sodium metal mass catalysis is employed.

In my copending application Ser. No. 254,454, filed November 1, 1951, I have disclosed that different and improved resimers may be obtained if, in the first step, instead of polymerizing the material with sodium metal, the polymer is formed by mass polymerization with organic catalysts that dissociate in butadiene to produce alkoxy-, alkyl-, or aryl free radicals. By that method one obtains polymers predominantly of 1,4-configuration as contrasted with the predominantly 1,2-configuration polymers yielded by the sodium metal polymerization. It also yields low molecular weight liquid polymers that can be poured into molds for the subsequent treatment. However, the method of polymerization produced substantial quantities of dimer requiring special precautions to prevent cracking of the material during the heat treatment thereof, and disclosed that the polymers produced by organo-free radical mass polymerizations are difficult to convert to useful resimers. The term "resimer" is herein used to designate the class of hardened cross-linked products derived by thermal cross-linking of a dieneic polymer, since no accepted name for such products is known, nor have such products heretofore been described in any very accurate terms, except by reference to the manner of their preparation.

PRESENT INVENTION

In further investigation, I have now ascertained that resimers of desirable hardness and toughness are obtainable from lower molecular weight polymers only with a greater degree of thermal cross-linking than is required when converting higher molecular weight polymers to resimers, and I have now discovered that improved resimers are obtained if, in the first step, instead of mass polymerizing the material with sodium metal or organo free radical catalysts, the polymer is formed by emulsion polymerization procedures that yield polymers not only predominantly of the 1,4-configuration characterizing the organo-free radical mass catalysed polymers, but also of a relatively high molecular weight, comparable with that obtained by sodium metal mass polymerization.

I have discovered, inter alia that by conducting the polymerization in emulsion, coagulating and drying the coagulum, and then molding the latter and converting it to a resimer product by heat treatment, hard resimer bodies of much larger size may be prepared, that are more resistant to cracking and decomposition during the resimerization, that are more resistant to solvent swelling and heat distortion for a given degree of cross-linking as measured by density increase, and that attain greater toughness on maximum thermal cross-linking.

The emulsion produced polymers of the present invention, may be employed in the impregnation and lamination of metal or glass fibre, cloth, mat, screen or foil and be resimerized thereon, and thus retain an advantage of the liquid and semi-liquid low molecular weight polymers of the copending application. In the case of the liquid or semi-liquid polymers of my copending application, the glass fibre material may be impregnated by dipping or coating with the polymer with or without aid of a solvent; in the case of the present emulsion produced polymers, the aqueous emulsion itself may be used to impregnate the fibres, and coagulated and dried in situ thereon, after which the impregnated fibre materials may be heat treated in sheet or stacked form with or without mechanical pressure to obtain a sheet or laminate that exhibits excellent resistance to high temperatures as well as outstanding electrical properties. While the dried emulsion formed polymer may also be used for these purposes with the aid of a solvent, the coating of the fibre with the emulsion before drying effects a saving of cost.

Still a further advantage of the present invention over that of my copending application resides in the absence of volatile constituents that may cause bubble formation or rupture of the cross-linking material; and the higher molecular weight of the emulsion produced polymers also affords greater resistance to fracture under the temperature conditions employed for cross-linking. Hence the present invention contributes substantially to facilitation of the cross-linking procedure.

If transparent products are desired it is important that the emulsion polymer be prepared so that it is substantially free of gel at the time it is molded. After molding the product may be gelled in the mold to an initial set, and further treated within or without the mold, and with exclusion of oxygen where coloration is to be avoided or minimized.

The exclusion of oxygen above mentioned may be satisfactorily accomplished by employment of an inert atmosphere, such as hydrogen, nitrogen, or less desirably carbon dioxide; or by employment of a vacuum; or when the treatment is in a closed vessel, by scavenging with an inert gas; or by heating under an inert liquid or a low melting metal or alloy.

MONOMERS EMPLOYED

The monomers that may be converted to resimers by the two step process of emulsion polymerization and subsequent heat treatment in accordance with this invention are herein termed "resimer-forming dieneic monomers." These monomers may be itemized as follows, and are subject to certain limitations as noted:

1. Butadiene
2. 1- or 1,4-hydrocarbon substituted butadiene
3. 2-hydrocarbon substituted butadiene together with other dienes in at least equimolar amount
4. Mixtures of any two or more of items 1 to 3
5. Any of items 1 to 4 with not to exceed an equal weight of vinyl monomer or monomers

POLYMERS THEREOF

For the purposes of this invention the above listed dieneic monomers are emulsion polymerized to form homogeneous or heterogeneous dieneic polymers. The homogeneous polymers, as will be clear from the list, comprise the homopolymers of item 1 or 2, and the copolymers of items 3, 4 or 5, and in the copolymers all the monomeric ingredients are combined and polymerized simultaneously. The heterogeneous polymers comprise interpolymers and mixed polymers corresponding to the copolymers with certain further limitations. In the interpolymers certain of the monomeric ingredients are sequentially polymerized together. In the mixed polymers, separate polymers of certain of the ingredients are formed and subsequently mixed together. Therefore, for interpolymers and mixed polymers, the limitation exists that the initially polymerized component, and the component or components added thereto must be compatible.

EMULSION POLYMERIZATION

The emulsion polymerization or polymerizations employ two phase systems in which the ingredients to be polymerized are in part not dissolved in an aqueous phase in such a manner as to influence during polymerization the molecular weight of the resultant polymer, thereby to obtain relatively high molecular weights combined with the predominantly 1,4-configuration characteristic of the products of emulsion polymerization.

The emulsion can be produced by either physical or chemical means. Thus, if water and butadiene, together with a free radical generating catalyst, such as cumene hydroperoxide, are subjected to the action of a mechanical vibrator yielding vibrations of a wave length suitable to produce the desired particle size (such as an ultra-sonic vibrator using a vibrating metal rod or plate or a quartz crystal) then an emulsion is produced and polymerization may be initiated and carried out under such vibratory condition to yield an emulsion dieneic polymerization product. The resultant product is free of emulsifier contamination.

Where it is not wished to employ such high frequency agitation and it is desired to form an emulsion merely by conventional low speed mechanical agitation, then with the aid of an emulsifying agent an emulsion can be formed and the polymerization carried out therein, provided the emulsifying agent is one that does not inhibit polymerization.

In preparing the resimer for extremely exacting dielectric use, emulsification without use of emulsifiers, e. g. high frequency agitation as above described, is preferred. If emulsifying agents are employed, then the emulsifier may be removed from the porous coagulum by extraction with a water solution of a base such as sodium- or ammonium-hydroxide followed by water washing, or by precipitation in a solvent for the emulsifier but not for the polymer. Thus the latex from the emulsion polymerization can be freed of emulsifier by adding to acidified alcohol directly. Such acidified alcohol may comprise methanol with sufficient hydrochloric acid to render the emulsifier alcohol soluble. Or instead, other procedures may be employed, for example the dissolving of the polymer and emulsifier in a solvent for both, such as benzene or toluene, and precipitating the polymer, as by addition of an antisolvent for the polymer, as a low molecular weight alcohol, ketone, or the like, such as methanol or acetone.

TYPICAL EMULSIFIERS

The emulsion polymerization for the purpose of this invention may be controlled by conventional emulsion polymerization procedures, in which emulsifiers are used with the polymerizable monomers and water and with a catalyst or a catalyst system such as a "Redox" system, and to which a modifier may be added to prevent cross-linking during the polymerization, or with which low polymerization conversions may be employed for the same purpose.

There is a rather large choice of emulsifying agents; anionic such as aliphatic amines and their acid salts; cationic such as soaps or alkyl-, aryl-, and alkaryl-sulfonates; nonionic such as addition products of polyethylene oxide. Protective colloids may be added, such as methylcellulose or polyvinyl alcohol.

Among the numerous emulsifying agents that may be employed typical ones are: sodium-, potassium-, ammonium-, organic amine-, organic hydroxylamine-, and other emulsion-forming and polymerization facilitating organic base-salts of organic acids such as carboxylic acids containing from about 8 to 24 carbon atoms. The latter include, for example, the salts of oleric, elaidic, stearic, palmitic and rosin acids; the salts of hydrogenated poly-unsaturated fatty acids including hydrogenated fish oil, hydrogenated fatty acids, and hydrogenated rosin-acids; salts of disproportionated rosin acids and of naphthenic acids, and salts of aromatic carboxylic acids such as those of cetyl p-dimethylamine benzoate. Other typical examples of emulsifiers are like salts of alkyl-, aryl-, and alkaryl sulfates; salts of organic and inorganic acids with amines and hydroxylamines containing carbon chains including from about 6 to about 24 carbon atoms, for example, dodecylamine hydrochloride, and other emulsifying agents that will permit diene polymerization.

TYPICAL DIENE MONOMERS

As above indicated, among the dieneic monomers that may be employed in practicing the present invention are butadiene, isoprene, 1,3-pentadiene, the various hexadienes such as dimethyl butadiene, 1,3-hexadiene, and various hydrocarbon substituted butadienes and pentadienes, within the limits mentioned above; butadiene being that presently preferred.

TYPICAL VINYL MONOMERS

Among the vinyl monomers that may be included as above set forth are those vinylic materials having the polymerizable group $H_2C:CR_1-$, in which $R_1$ is selected from the group comprising hydrogen and methyl radical. More particularly are contemplated those vinylic materials having the polymerizable group $H_2C:CR_1R_2$, in which $R_1$ is hydrogen or methyl and in which $R_2$ is an aryl, substituted aryl, ester, or cyano group. Examples in which $R_1$ is hydrogen are: styrene, vinyl toluene, acrylic acid esters, acrylonitrile, 2-vinyl pyridine and divinylbenzene. Examples in which $R_1$ is a methyl group are: alpha methyl styrene, alpha methyl vinyl toluene, methacrylic acid esters, and methacrylonitrile. These examples are to be considered as illustrative, and not restrictive, of the various vinylic materials capable of forming copolymers and interpolymers with the dienes previously referred to, or of forming polymers compatible with such dieneic polymers and sufficiently heat stable to permit the resimerization of the co-, mixed, or interpolymers, as contemplated by this invention, either alone or in combination with other vinylic materials.

TYPICAL CATALYSTS

Conventional catalysts that may be employed in the emulsion polymerization step comprise those of the organic peroxide or hydroperoxide type, as benzoylperoxide, cumene hydroperoxide, paramenthane hydroperoxide, lauryl peroxide, acetyl peroxide, benzoyl acetyl peroxide, butyl-tertiary amyl peroxide, di-tertiary butyl peroxide, and other representative alkyl-, aryl-, arylakyl-, alkaryl-, alicyclic-, or heterocyclic-peroxides or hydroperoxides; organic catalysts of the azo type that generate free radicals by the elimination of nitrogen, for example, diazoamino benzene and 2-azo-bisisobutylnitrile; inorganic catalysts such as sodium, potassium, and ammonium persulfates; and others.

The "Redox" catalyst systems, as is well known, involve the use of an oxidizing material together with a reducing material in such combination that free radicals are generated capable of inducing and carrying forth polymerization. For example, the organic peroxides and inorganic persulfates listed above may be used in connection with ferrous iron or with various sugars and iron- or cobalt-salts, or the organic peroxides may be used with amines or particularly polyalkyl-polyamines. Typical redox systems with references to formulations are set forth, for example, in Polymerisations-Kinetik, by L. Kuechler, Springer, Heidelberg, Germany, 1951, pages 151–160.

TYPICAL MODIFIERS

Examples of modifiers suitable to prevent cross-linking during the polymerization are primary-, secondary-, or tertiary-hydrocarbon mercaptans containing preferably 8 to 18 carbon atoms.

EMULSION POLYMERIZATION PROCEDURES

Any suitable procedure for the preparation of the dieneic polymers by emulsion polymerization may be employed. For example water and appropriate monomers together with an emulsifying agent may be charged into a closed vessel and agitated therein whereby the monomers become emulsified. A mercaptan or other modifier, if desired, and the catalyst or catalyst system is added and agitation may be continued while maintaining a reaction temperature suitable for the particular recipe and the polymer being made. In most cases the temperature of polymerization may be varied considerably within a range, say from 100° C. or higher down to −30° C. or lower. However, the range of 50° C. to −5° C. is usually preferred. Of course when the chosen polymerization temperature is below the freezing point of water, an electrolyte or anti-freeze material is added to the emulsion, methanol and glycerine being examples of suitable anti-freeze materials. The pH of the system may be controlled, where necessary or desired, by a buffer, e. g. a soluble phosphate or pyrophosphate.

Typical charging formulae for 15 hour emulsion polymerization times are shown in the following examples for representative types of monomers:

*Example A.*—*Dieneic polymers containing no vinyl component (polymerization at +5° C.)*

| Component | Parts by wt. |
| --- | --- |
| One or more dienes such as butadiene and its hydrocarbon homologs as above limited | 100–99.8.[1] |
| Potassium soap of disproportionated rosin acid | 5. |
| Water | 200. |
| FeSO₄ | 0.1. |
| Cumene hydroperoxide | 1.0. |
| Glucose | 1.0. |
| Tertiary dodecyl mercaptan | 0.2. |
| Potassium pyrophosphate | 1.0. |

[1] 0.2% of impurities including vinyl not distinguishable by spectroscopic analysis.

Dieneic polymers containing vinyl of the type H₂C:CH—: e. g.:

*Example B.*—*Butadiene-styrene copolymers (Polymerization at 45° C.)*

| Component | Parts by wt. |
| --- | --- |
| Butadiene | 50 to 99.8. |
| One or more vinyl monomers such as styrene, vinyl toluene, vinyl pyridine, vinyl acetate, ethylacrylate, acrylonitrile, or the like | 50 to 0.2.[1] |
| Water | About 200. |
| Soap (sodium oleate-stearate mixture) | 5. |
| Dodecyl mercaptan | 0.3. |
| Cumene hydroperoxide | 0.2. |
| Ferrous sulfate | 0.1. |
| Glucose | 1.0. |
| Potassium Pyrophosphate | 0.5. |

[1] The value of 0.2% by weight of styrene is given in this example since this is the smallest percentage of styrene that is spectroscopically detectable in the copolymer to distinguish it, as such, from the butadiene homopolymer in Example A.

*Example C.*—*Dieneic polymers comprising isoprene (polymerization at +5° C.)*

| Component | Parts by wt. |
| --- | --- |
| Butadiene | 50 ot 99.8. |
| With isoprene | 50 to 0.2. |
| Vinyl monomer | 0 to 100.[1] |
| Potassium soap of hydrogenated rosin acids | 5–10. |
| Water | 180–400. |
| Potassium persulfate | 0.02–1.0. |

[1] In no case to exceed quantity of dienes.

*Example D.*—*Dieneic polymers comprising vinyl of the type H₂C:CCH₃—(polymerization temperature −5° C.)*

| Component | Parts by wt. |
| --- | --- |
| Butadiene | 50 to 99.8. |
| One or more vinyl monomers such as methylmethacrylate, methacrylonitrile, etc | 50 to 0.2. |
| Glucose | 1.0. |
| Sodium oleate | 5.0. |
| Potassium pyrophosphate | 1.0. |
| Water | 200. |
| FeSO₄ | 0.1. |
| Turpentine peroxide | 0.5. |
| Dodecyl mercaptan | 0.0–0.4. |
| Antifreeze (glycerine, methanol, etc.) | Sufficient. |

*Example E.*—*Dieneic polymers comprising both H₂C:CH— and H₂C:CCH₃—type vinyls (polymerization temperature +50° C.)*

| Component | Parts by wt. |
| --- | --- |
| Butadiene | 50 to 99.8. |
| Equimolar mixture of styrene and alpha methyl styrene | 50 to 0.2. |
| Water | 200. |
| Cationic detergent (e. g. dodecyl ammonium chloride) | 5. |
| Tertiary cetyl mercaptan | 0.5. |
| Potassium persulfate | 0.2. |

The above formulae are intended as illustrative only and are not to be construed as limiting the procedures that may be employed in obtaining emulsion dieneic polymers that may be converted to resimers in accordance with this invention. The recipes listed are typical of the various types of vinyl monomers currently most used; the polymerization temperatures are also typical of those currently commercially used in emulsion polymerization; and it is to be understood that any of these monomer mixtures, and any diene-vinyl mixtures of the specified range other than those specifically mentioned, can be polymerized throughout the indicated temperature range by using an appropriate one of the catalytic systems exemplified.

In the formation of homogeneous polymers, when the polymerization has been carried to the desired conversion, a short stop agent may be added if desired, and the polymer latex may then be coagulated with alcohol, acid, or salt, or both, and separated by filtering, centrifuging, or other appropriate means, and dried.

In the formation of an interpolymer in which the first polymerized ingredient or ingredients do not require limitation of conversion, the compatible monomer or monomers to be subsequently polymerized with such ingredients may be added to the original polymer latex, together with additional catalyst when needed, and the polymerization continued. Such addition may be practiced when the first polymerization is virtually complete, in which case nearly all of the product of the second polymerization will be in the form of separate independent molecules interspersed with those of the first or in the form of terminal additions to the polymer molecules formed in the first polymerization. On the other hand, the addition may be made when the first polymerization has been carried to only a minor or major degree of conversion, in which case the second formed polymer molecules or additions may be a copolymer of the original and added monomers partially as separate molecules and partially as terminal additions to the polymer chains formed by the first polymerization. In these cases, the conversion in the second polymerization may be controlled by short stopping agents, and the interpolymer may then be coagulated, separated, washed, and dried.

In the formation of an interpolymer in which the first polymerization requires limitation of conversion, this may be effected by the use of a short stopping agent, which agent with unreacted monomer, may be eliminated in any suitable way before proceeding with the inter-polymerization of added compatible monomer. Where necessary or desirable, the first emulsion-formed polymer may be coagulated and the interpolymerization of further ingredients therewith may be effected by mass polymerization with or without the aid of a solvent, in which case the diene components are preferably those initially polymerized in emulsion so as to ensure the obtaining of the desired predominantly 1,4-configuration of diene-polymer combined with relatively high molecular weight.

Finally, in forming the mixed polymer, a first dieneic polymer may be formed by emulsion polymerization, and one or more additional compatible polymers may be separately formed, that are then intimately mixed with the first. Where a compatible polymer to be added is formed by emulsion polymerization, the mixture may be effected by adding the latices together before coagulating and drying. Alternatively the first dieneic emulsion homogeneous polymer may be coagulated and dried, and the dried additional polymers may be milled thereinto.

CONVERSION TO RESIMER

When the dried emulsion dieneic polymer has been obtained of the desired molecular weight and with its diene components predominantly of 1,4-configuration, it is ready for molding, with or without aid of a solvent, and heat treatment to convert it to the resimer.

The time and temperature of heating are varied to produce a degree of cross-linking consonant with the desired balance between physical properties, such as the hardness and toughness of the emulsion dieneic resimer. As cross-linking increases, the density of the product also increases and solubility disappears.

The temperature range for the conversion of dieneic emulsion polymers to resimers is as a practical matter limited at its lower end by the excessive length of time required to effect cross-linking at temperatures as low as 250° C., and at its upper end by the tendency of temperatures as high as 300° C. or more to cause decomposition of the materials. Temperatures of 260° to 280° C. are suitable and higher and lower temperatures may be employed in certain instances.

If for certain uses it is desirable to have a completely unreactive resimer, the cross-linking reaction should be carried to the maximum extent practicable. If it is desired to obtain this condition without such a high degree of cross-linking, the invention contemplates the reduction of the number of ethylene bonds available for cross-linking as by partial hydrogenation, partial chemical saturation, the addition of maleic anhydride, or partial cyclization in a solvent with or without Friedel-Crafts type catalyst, and the residual unsaturation may then be cross-linked to the maximum extent possible, in which case the final product is stable against further hardening on subsequent exposure to high temperatures.

This and other steps, and various additives, may be employed to obtain special effects or advantages in connection with the practice of the present invention, but their use with the present invention is optional. Where such special provisions are believed to constitute independent inventive improvements they are considered to be divisible subject matter, and only where they and the principal invention herein mutually contribute to the production of a single result will they be claimed herein. These special provisions include use of high pressures to speed up the resimerization; use of accelerators or catalysts for the same purpose; light vulcanization or partial chemical cross-linking prior to heat resimerization to release molding equipment for re-use, in lieu of mild heat cross-linking employed for the same purpose; addition of coloring or colorable constituents; colloidal dispersion of solid polymer for emulsion treatment; employment of fillers or extenders in general; use of products of one type of polymerization as ingredients in the formation of inter- or mixed polymers by another type of catalytic system; and the freezing of emulsion dieneic polymers and powdering thereof at low temperatures to form molding powders for heat resimerization alone or with other ingredients.

Where structural resimers are being produced, the following approximate temperatures and times of heating of the dieneic polymer illustrate suitable conditions, but are not intended to be restrictive of this invention:

| Temperature, ° C.: | Time, hours |
|---|---|
| 225 | 50–500 |
| 250 | 40–200 |
| 275 | 30–140 |
| 300 | 20–60 |

Resimerizing in desired shapes may be accomplished by holding the emulsion polymer in an open or sealed mold with or without external application of pressure while obtaining an initial set by heat treatment, followed by further heat treatment to continue the cross-linking with the shaped article either retained in the mold or removed from it. The heating of the mold may be effected in any suitable way, and form retaining articles removed from molds may be heated in an inert medium with or without application of pressure or vacuum.

WITH OTHER ADDITIVES

Fillers may be added to the dieneic emulsion polymers of this invention before resimerization. For example, carbon black of a reinforcing or semi-reinforcing nature, thermatomic black, acetylene black and the like, mineral pigments such as clay, calcium silicate, iron oxide, chromium oxide, zinc oxide, titanium dioxide and the like, may be used.

Thus the three-dimensional cross-linking reaction of emulsion dieneic polymers to produce cross-linked material as disclosed herein is not restricted to the thermal or thermal-pressure treatment of such polymers or their mixtures alone, but includes such polymers to which inorganic or organic fillers have been added. The physical characteristics of the fillers, such as particle size and shape, determine the quantity of filler which may be added. Previously formed dieneic resimers of suitable particle size may also be used as organic fillers in the dieneic emulsion polymer to be resimerized. For special requirements the filler may be an abrasive such as silicon carbide or a conductor of electric current such as metal powders, flakes, foils, filaments, etc., it being beyond the scope of this invention to designate all of the various applications where the use of an inorganic or organic filler or mixtures thereof may be useful in dieneic emulsion polymer resimers.

Often times it is also advantageous to add anti-oxidants where the resimerization is to be conducted without complete exclusion of oxygen. Seconary aromatic amines, phenolic compounds, reaction products of amines and ketones, as, for example, phenylbetanaphthylamine, hydroquinone, monobenzylether or paraphenyl-phenol, may be employed for the purpose.

While the invention in its broader aspects has been fully described above, reference will here be made to several typical examples of its complete application to the formation of emulsion dieneic resimers.

Example I

An emulsion butadiene polymer was prepared by the following recipe:

| Ingredients | Parts |
| --- | --- |
| Butadiene-1,3 | 100. |
| Tertiary dodecyl mercaptan | 0.1. |
| Sodium soap of disproportionated rosin acids | 4.6. |
| Sodium hydroxide | 0.15. |
| Potassium persulfate | 0.26. |
| Water | 180. |
| Reaction temperature | 122° F. |
| Reaction time | 15 hours. |
| Hydroquinone | 0.20 (monomer basis). |
| Anti-oxidant, Phenyl-B-Naphthylamine | 1.5 (total solids basis). |

In the polymerization with this recipe, the sodium soap of disproportionated rosin acids (obtainable from Hercules Powder Co. as "Dresinate" 731) is the emulsifier; the potassium persulfate is the catalyst, that operates by generating from tertiary dodecyl mercaptan free radicals for initiating polymerization, and only a small part of the mercaptan in this recipe functions as a chain transfer agent or modifier. The sodium hydroxide adjusts the pH. The hydroquinone is added when the desired stage of polymerization is reached to stop further polymerization, and the anti-oxidant is added at this time to permit drying in air without oxidation.

The latex produced was coagulated by addition of salt and acid to the emulsion, and the agglomerate was washed and dried, dissolved in hexane and applied to glass cloth to the extent of approximately 30% polymer and freed of solvent by evaporation. The coated cloth was placed in a laminating press which was heated at 180° C. for two hours and then removed from the press, clamped between metal plates and submerged in a bath of molten metal (lead and tin) that was maintained at 280° C. for 60 hours. The clamped article was then cooled over a period of 8 hours and removed.

The laminated product was heat stable at 250° C., showed no separation of the components, was chemically inert, and high in tensile and compressive strength. In contrast to laminates formed with low molecular weight liquid polymer as employed in the above mentioned copending application, the dieneic material had no tendency to flow out of the glass cloth in the press, and was easily produced without need for special precautions in the heating to avoid the effects of volatile constituents.

Example II

The latex from Example I, without coagulation, was employed to impregnate the glass cloth, and dried thereon. The coated cloth was then laminated as in Example I, and a laminate obtained essentially identical with that of Example I in all visible respects.

Example III

An emulsion polymer was prepared as follows:

| Ingredients | Parts |
| --- | --- |
| Butadiene | 70. |
| Acrylonitrile | 30. |
| Tertiary dodecyl mercaptan (modifier) | 0.36. |
| Dresinate 731 (Hercules) | 4.6 |
| Sodium hydroxide | 0.11. |
| Trisodium phosphate dodecahydrate | 0.5. |
| Cumene hydroperoxide (100% basis) | 0.2. |
| Ferric pyrophosphate (monohydrate) | 0.18. |
| Sodium pyrophosphate (anhydrous) | 0.18. |
| Dextrose | 3.0. |
| Water | 180. |
| Reaction temperature | 41° F. |
| Reaction time | 30 hours. |
| Short stop, dinitrochlorobenzene | 0.3 (monomer basis). |
| Antioxidant, Phenyl-B-Naphthylamine | 2.5 (total solids basis). |

The latex salt (NaCl) and acid ($H_2SO_4$) coagulated, dried and milled into a sheet, was then pressed in a mold at at 110° C. for 15 minutes. The mold was clamped together with C-clamps and placed in an inert atmosphere oven. The temperature of the oven was continually increased from 50° C. to 250° C. over a period of 60 hours, and then raised to 275° C. in a period of 20 hours. The temperature was then held at 275° C. for an additional 60-hour period. The oven was then allowed to cool to room temperature over a period of 30 hours, and the finished resimer article was removed.

The product of this example contains the polar vinyl, acrylonitrile, and otherwise is similar to the resimer from Example I. The principal difference is that the polar groups, while reducing the dielectric excellence of the material, are of advantage if it is necessary to form or machine resin pieces which must be glued to each other or to other plastics, wood, glass or other non-metallic substances or metals. The polar groups on the resin surface act as anchor points for adhesives or glue through hydrogen bonding or through actual chemical linkage such, for example, as in the case of a phenol-formaldehyde adhesive.

Example IV

An emulsion polymer was prepared as follows:

| Ingredients | Parts |
| --- | --- |
| Butadiene | 90. |
| Methylmethacrylate | 10. |
| Tertiary dodecyl mercaptan | 0.23. |
| Potassium salt of hydrogenated rosin acids | 4.6. |
| Ethylene diamine tetra sodium tetra acetate | 0.01. |
| Tripotassiumphosphate | 0.60. |
| Diisopropylbenzene hydroperoxide | 0.15. |
| Tetraethylenpentamine | 0.05. |
| Water | 200. |
| Reaction temperature | 41° F. |
| Reaction time | 16 hours. |
| Short stop, dinitrochlorobenzene | 0.3. |
| Antioxidant (Phenyl-B-Naphthylamine) | 1.5. |

The latex was coagulated, dried and milled into a sheet, and pressed into a locking mold and then placed in an inert oven, the temperature of which gradually raised from room temperature to 280° C. in 80 hours and then held at 280° C. for 40 hours, after which it was cooled to room temperature during a 20-hour period. The mold was then removed and opened, yielding the resimer article.

The product, like that of Example III, because of the contained polar groups, shows good retentivity with respect to adhesives and coating compositions, and high bonding when used in conjunction with inorganic fibres or fillers also containing oxygen.

Example V

An emulsion polymer was prepared as follows:

| Ingredients | Parts |
| --- | --- |
| Butadiene | 78. |
| Styrene | 22. |
| Tertiary dodecyl mercaptan | 0.21. |
| Potassium salt of disproportionated rosin acids | 5.0. |
| Potassium chloride | 0.2. |
| Potassium hydroxide | 0.14. |
| Cumene hydroperoxide (100% basis) | 0.16. |
| Ferrous sulfate hepta hydrate | 0.36. |
| Tetra potassium pyrophosphate (anhy.) | 0.281. |
| Potassium sulfite | 0.08. |
| Methanol | 40. |
| Water | 180. |
| Reaction temperature | 14° F. |
| Reaction time | 50 hours. |
| Short stop dinitrochlorobenzene | 0.3. |
| Antioxidant (Phenyl-B-Naphthylamine) | 2.5 (basis total solids). |

The latex was coagulated by adding to acidified hot methanol, washed with methanol and dried and milled into a sheet, then pressed into a locking mold and placed in an inert atmosphere oven, the temperature of which was held for 20 hours at 200° C. Then the temperature was raised to 225° C. and held for another 20-hour period, after which the temperature was raised to 250° C. and held for another 20 hours. Then the temperature was raised to 275° C. and held for 20 hours, after which the temperature was raised to 300° C. and held for a 20-hour period. The oven was allowed to cool to room temperature over a period of 30 hours. Then the oven was opened and the mold removed yielding the resimer article.

The product is highly useful where greater resilience and toughness are desired, requiring only limited cross-linking, but where low unsaturation with consequent high dielectric value and thermal stability are requisites. The non-polar styrene component in effect reduces the overall unsaturation available for cross-linking.

Example VI

An emulsion polymer was prepared as in Example V, with 90 parts butadiene and 10 parts vinyl toluene, and converted to resimer by the same procedure.

The product exhibited a marked degree of resiliency and toughness, and other characteristics rendering it suitable for the same purposes as the product of Example V.

By similar molding and heating procedures, emulsion resimers may be prepared from any of the resimer forming dieneic monomers previously described, emulsion polymerized by conventional procedures as typified in Examples A-E, and then thermally treated as exemplified in Examples I-VI.

While there have been described herein what are at present considered preferred embodiments of the invention, it will be obvious to those skilled in the art that minor modifications and changes may be made without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. A process for producing a resin product by thermal treatment of a polymer, in which the polymer is a polar copolymer prepared by emulsion co-polymerization of (a) a polar vinyl monomer selected from the group consisting of acrylonitrile and methylmethacrylate and (b) at least an equimolar proportion of copolymerizable conjugated diene hydrocarbon monomer having up to six carbon atoms, and in which said polar copolymer is slowly heated to temperatures between 250° C. and 300° C. and maintained at such temperatures for a period, decreasing with increase of heating temperature, of between 20 and 500 hours.

2. The resinous thermal reaction product of the process of claim 1.

References Cited in the file of this patent

UNITED STATES PATENTS 1,901,044     Schmidt et al.     Mar. 14, 1933